United States Patent [19]

Fleagle

[11] 4,036,537

[45] July 19, 1977

[54] TIME DELAYED ACTUATION OF WHEEL SLIP CONTROL SYSTEM FOR AUTOMOTIVE VEHICLES AND THE LIKE

[75] Inventor: Joseph E. Fleagle, Overland, Mo.

[73] Assignee: Wagner Electric Corporation, Parsippany, N.J.

[21] Appl. No.: 620,164

[22] Filed: Oct. 6, 1975

[51] Int. Cl.² .......................... B60T 8/02; B60T 8/08
[52] U.S. Cl. ...................................... 303/106; 303/20
[58] Field of Search ............... 188/181 R; 303/20, 21, 303/106, 111; 307/10 R; 317/5; 340/53, 62

[56] References Cited

U.S. PATENT DOCUMENTS

| | | | |
|---|---|---|---|
| 3,697,139 | 10/1972 | Elliott et al. | 303/21 R |
| 3,756,663 | 9/1973 | Fink et al. | 303/21 BE |
| 3,832,013 | 8/1974 | Davis et al. | 303/106 |
| 3,863,993 | 4/1975 | Fleischer et al. | 303/21 BE |
| 3,877,755 | 4/1975 | Carp et al. | 303/21 P |
| 3,902,763 | 9/1975 | Takeuchi | 303/21 BE |
| 3,929,382 | 12/1975 | McNinch, Jr. et al. | 303/21 BE |
| 3,930,688 | 1/1976 | Rau et al. | 303/106 |

Primary Examiner—Stephen G. Kunin
Attorney, Agent, or Firm—Eyre, Mann, Lucas & Just

[57] ABSTRACT

A delay circuit in a wheel-slip control system prevents spurious triggering of the wheel slip control system due to false signals originating in misalignment, dirt or damage in wheel speed sensors. A time-delay circuit requires completion of a first cycle of wheel slip control system actuation, wherein both deceleration and velocity criteria must both be met, before deceleration signals alone are allowed to actuate the wheel slip control circuits. A timer enables subsequent cycles of actuation of the wheel slip control system by acceleration alone during a normal sequence of actuations within one brake application.

8 Claims, 2 Drawing Figures

TIME DELAYED ACTUATION OF WHEEL SLIP CONTROL SYSTEM FOR AUTOMOTIVE VEHICLES AND THE LIKE

CROSS-REFERENCE TO RELATED APPLICATIONS

This invention is designed to be used with wheel slip control systems of the type which utilize both acceleration signals and acceleration plus velocity signals for actuation of brake-relief devices. It is usable specifically with respect to the invention in U.S. Pat. No. 3,951,467, entitled WHEEL SLIP CONTROL SYSTEM FOR AUTOMOTIVE VEHICLES AND THE LIKE, in the name Joseph C. Fleagle, issued Apr. 20, 1976. This invention is not restricted to use solely with the cited related invention, but instead has general application to anti-skid systems using both acceleration and velocity for automatic cyclic relief of braking systems to prevent or reduce skidding.

The present invention is best described by reference to U.S. Pat. No. 3,951,467, the disclosure of which is incorporated by reference herein.

FIG. 1 of the present application is the same as FIG. 1 of referenced U.S. Pat. No. 3,951,467 except for the inclusion herein of the additional elements comprising the present invention which are clearly set off in box 110.

The following abstract describes the referenced invention.

ABSTRACT OF ALLOWED U.S. PAT. NO. 3,951,467

A control system for adjusting the pressure applied to fluid-controlled brake actuating mechanisms in response to predetermined variations in wheel speed and rate of change of wheel speed brought about by the application of fluid pressure to the wheel brake actuating mechanisms. Signals proportional to the angular velocity and rate of change of angular velocity of a selected wheel are employed to control the sequence and duration of the energization and de-energization of the solenoid valves in a modulator valve assembly. The incremental decrease in wheel velocity from the time said deceleration threshold is reached, at which time a gradual adjustment of brake line fluid pressure is effected, is monitored to determine when a continuously-variable reference increment of wheel speed $\Delta v$ has been exceeded, at which time a sharp reduction in brake line fluid pressure is effected. This continuously-variable reference increment $\Delta v$ is defined in each cycle by (1) the value of wheel velocity at the time said deceleration threshold is reached and (2) a variable reference signal which is related to both wheel speed and deceleration during periods of deceleration of the monitored wheel, and is related only to acceleration during periods of acceleration of the monitored wheel.

The following is claim 1 of the referenced allowed U.S. Pat. No. 3,951,467:

1. A wheel slip control system for a vehicle having at least one wheel with associated braking means, comprising:
    1. first means operative to generate a first output whenever (a) the rate of change of rotational velocity of a selected wheel exceeds a deceleration threshold or (b) the change in rotational velocity of the selected wheel, measured from the value of said rotational velocity at the time said rate of change of rotational velocity exceeds said deceleration threshold, exceeds a reference increment of wheel speed which is variable in relation to both the velocity and the deceleration of the selected wheel during deceleration of the selected wheel and in relation to acceleration during acceleration of the selected wheel, said first means being further operative to generate a second output whenever the change in rotational velocity of the selected wheel, measured from the value of said rotational velocity at the time said rate of change of rotational velocity exceeds said deceleration threshold, exceeds said variable reference increment of wheel speed: and
    2. second means operative in response to at least said second output to effect a decrease in the braking force applied to at least said selected wheel.

SUMMARY

This invention relates to wheel slip control systems for automotive vehicles, and more specifically to the type of automatic wheel slip control systems which use sensed parameters of velocity and acceleration to automatically control cyclic brake-relief operation. It has been found that point-type wheel speed sensors 10, 12 are subject to mechanical misalignments and other faults which produce spurious cyclic apparent velocity changes one or more times per wheel rotation. The spurious velocity changes are interpreted by differentiator circuits 20 as spurious accelerations or decelerations. In a wheel slip control system which responds at least in part directly to wheel deceleration or acceleration, nuisance triggering of the wheel slip control system can occur from such spurious acceleration or deceleration signals on each rotation of the wheel.

This invention applies especially to systems which have two stages of wheel slip control; namely a first stage which is actuated by acceleration or deceleration exceeding a threshold only, plus a second stage which is actuated by exceeding an acceleration or deceleration threshold and simultaneously exceeding a velocity change threshold. This invention suppresses wheel slip control operation due to exceeding the acceleration/deceleration threshold alone unless that condition is preceded by exceeding the velocity change threshold as well. Once the required acceleration/velocity change combination is achieved, actuation by acceleration/deceleration alone is enabled by a timer circuit for a short time thereafter. Wheel slip control system operation over one stopping period is cyclic. That is, the wheel slip control circuits rapidly cycle on and off during the period of bringing the vehicle to a stop. Consequently, there is little effect from suppressing a single actuation of one solenoid valve in the wheel slip control system at the beginning of the wheel slip control cycle.

It has been customary to solve the problem of interference of this sort by heavy filtering of the acceleration/deceleration signal to remove the cyclic variations. Although this performs the function, it also introduces unacceptable delays into the system response during the entire period of the stopping sequence of the vehicle. A stopping sequence of the vehicle can persist for several seconds. The present invention merely delays the initiation of the wheel slip control sequence for a small fraction of a second. The delay is introduced one time at initiation of the sequence. Thereafter, no delay whatever is introduced until the start of an entirely new wheel slip control sequence.

DESCRIPTION OF THE PREFERRED EMBODIMENT

Figure 1:
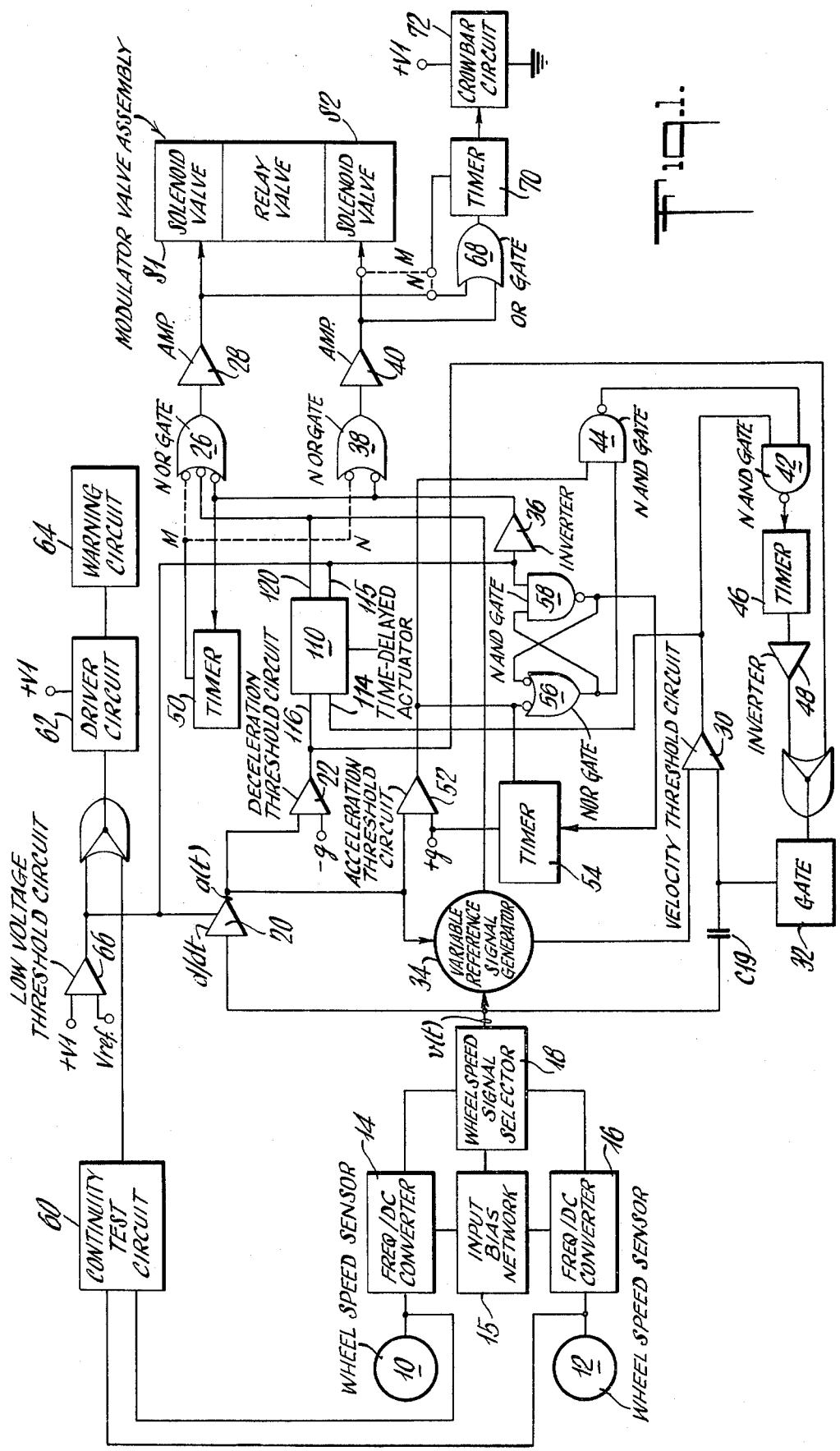
FIG. 1 shows the invention embedded within a typical wheel slip control systems of the type recited in the reference to related applications. The present invention is set off in box 110 in FIG. 1. Components of the present invention are identified with reference designators exceeding 100.
Figure 2:
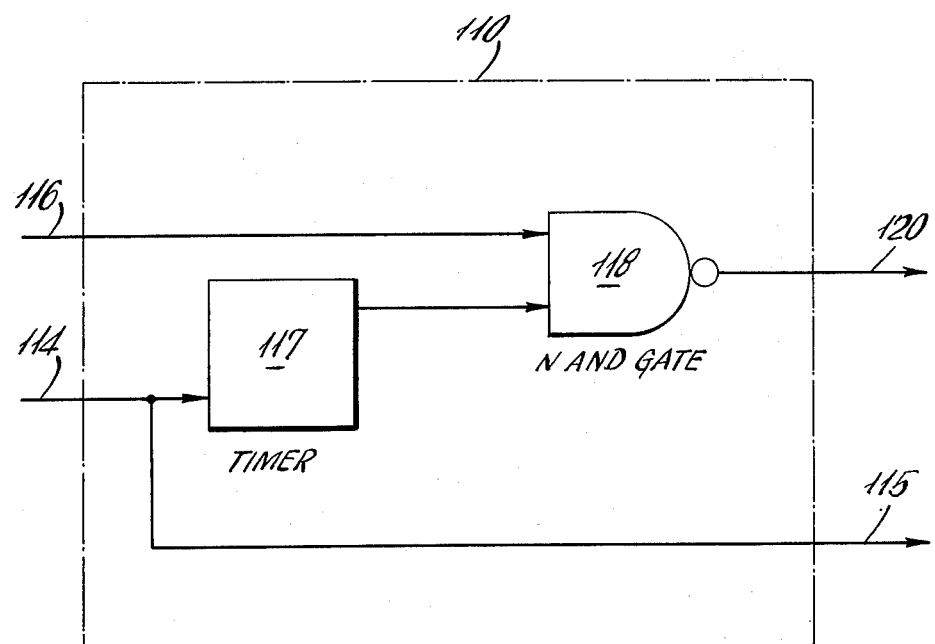
FIG. 2 contains a logic diagram of the contents of box 110.

Operation of the wheel slip control system itself is described in the referenced application which is incorporated by the reference herein. The following description is limited to the present invention shown in FIGS. 1 and 2.

A deceleration signal 116 incoming from the deceleration threshold circuit 22 of the wheel slip control system generated by circuits 10,12,14,16, and 18 indicates that the sensed negative rate of change of velocity exceeds a threshold value. Before the beginning of the wheel slip control sequence, a normal low output from timer 117 holds NAND gate 118 cut off. While it is preferred to use a NAND gate it is to be understood that any equivalent circuits performing the same function, such as an AND gate followed by an inverter, may be used. Thus the first time the deceleration signal 116 occurs, it is unable to trigger a change in output of NAND gate 118. The wheel slip signal 114, input from the wheel slip control system generated by circuits 10, 12, 14, 16, 20, 22 (or 52), 34, 32, 30 and associated gating and timing circuits, is generated only when both a deceleration threshold and a velocity change threshold are simultaneously exceeded. The slip signal 114 input to the timer 117 is also connected by way of output line 115 to operate a first solenoid valve for wheel slip control. The timer 117 is triggered at the end of the slip signal 114 to provide an enable signal to NAND gate 118 for a short period following the termination of the slip signal 114.

Normally a second cycle in the sequence of genuine slip control pulses will occur within the time period wherein NAND gate 118 is enabled by timer 117. Consequently, NAND gate 118 will be enabled for the second deceleration signal 116 in the slip control sequence. NAND gate 118 thus provides a solenoid S1 energization signal 120 to a second solenoid valve for wheel slip control on the second and subsequent cycles in the sequence of wheel slip control.

At the end of brake application, timer 117 is allowed to complete its timing cycle. An inhibit signal is thereupon restored to the input of NAND gate 118. NAND gate 118 is thereby prevented from connecting the next-occurring acceleration pulse to its output.

What is claimed is:

1. In combination with a wheel slip control system for automotive vehicles and the like wherein deceleration signals and deceleration plus velocity change signals are separately processed to provide two or more levels of brake relief, the invention comprising:
    a. means for blocking at least a first level of brake relief;
    b. means for removing the block from said first level of brake relief;
    c. said means for removing being actuated by the trailing edge of a signal indicating the first simultaneous occurrence of a predetermined combination of wheel velocity and wheel deceleration conditions; and
    d. said means for removing containing means for remaining continuously actuated as long as the time between the trailing edges of the signals indicating succeeding simultaneous occurrences of said predetermined combination of wheel velocity and wheel deceleration conditions remains below a predetermined value.

2. The apparatus recited in claim 1 wherein said blocking means is a NAND gate normally maintained in the blocking condition by an inhibit signal at one of its inputs.

3. The apparatus recited in claim 1 wherein the blocking means comprises:
    a. a NAND gate; and
    b. a timer normally providing an output which inhibits the operation of said NAND gate.

4. The apparatus recited in claim 3 wherein the occurrence of the predetermined combination of signal is operative to trigger said timer into providing an enable signal to one input of said NAND gate for a predetermined time period following the end of said trigger, said NAND gate thereupon being enabled to connect said brake-relief signal to using circuits for the duration of said timer enable signal.

5. In combination with a wheel slip control system for automotive vehicles and the like wherein a first level of brake relief is generated in response to a predetermined condition of deceleration and a second level of brake relief is generated in response to a predetermined combination of deceleration plus velocity change signals, the invention comprising:
    a. means for blocking said first level of brake relief;
    b. means for removing said block;
    c. wherein said means for removing is actuated by the trailing edge of a signal indicating the end of said second level of reduction in braking effort; and
    d. said means for removing containing means for remaining continuously actuated as long as the time between the trailing edges of the signals indicating succeeding simultaneous occurrences of said predetermined combination of wheel velocity and wheel deceleration conditions remains less than a predetermined amount.

6. The apparatus recited in claim 5 wherein said means for blocking comprises:
    a. a NAND gate; and
    b. a timer normally providing an output which inhibits said NAND gate.

7. The apparatus recited in claim 6 wherein said timer is triggered into providing an output for a predetermined time which enables said NAND gate upon occurrence of the end of said second level.

8. In combination with a wheel slip control system for automotive vehicles and the like wherein acceleration signals and acceleration plus velocity change signals are separately processed to provide two or more levels of wheel slip control, the invention comprising:
    a. a NAND gate operative to block at least a first level of brake relief;
    b. a timer normally inhibiting one input of said NAND gate; and
    c. said timer being triggered into enabling said NAND gate for a predetermined period of time upon the simultaneous occurrence of a predetermined combination of wheel velocity and wheel acceleration conditions.

* * * * *